May 12, 1953   R. W. SKINNER ET AL   2,638,141
SHEET METAL BENDING BRAKE
Filed Jan. 9, 1951
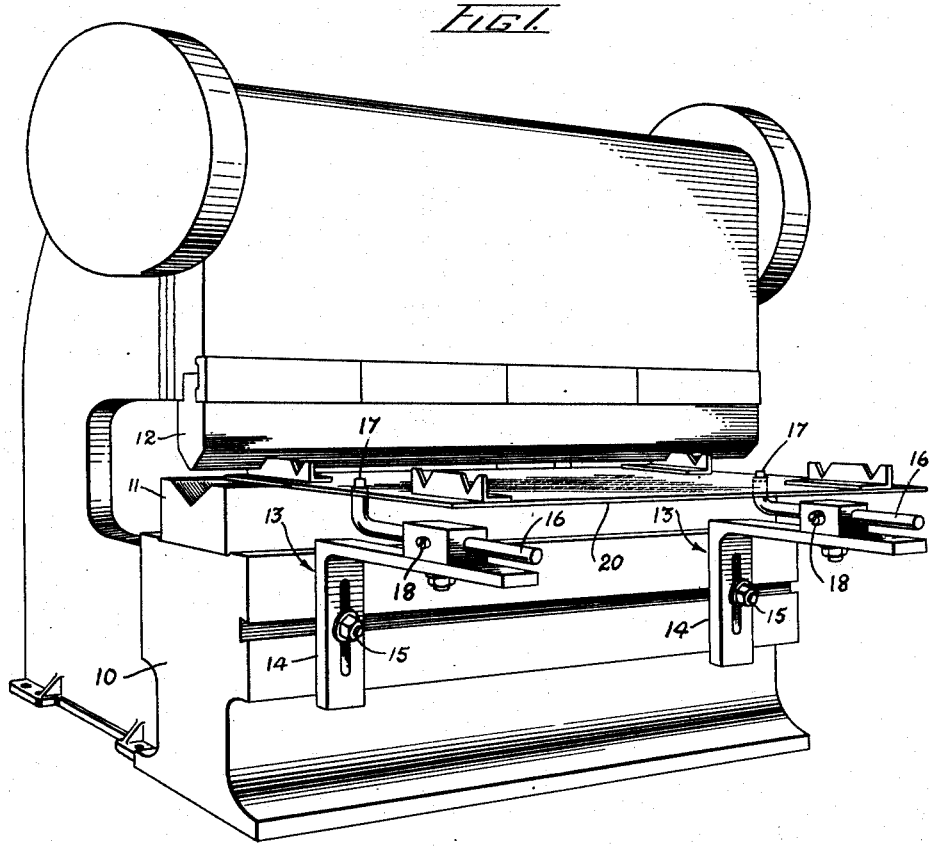
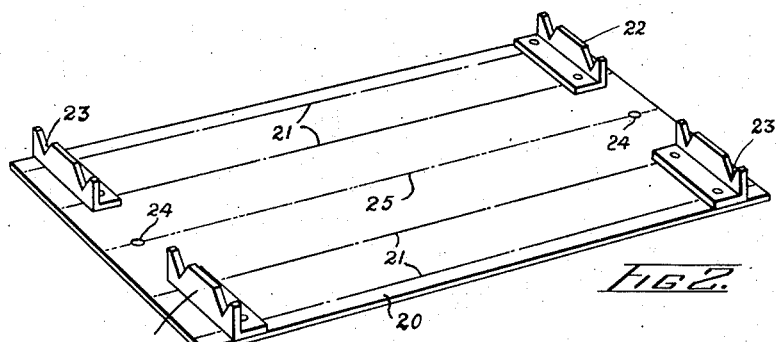
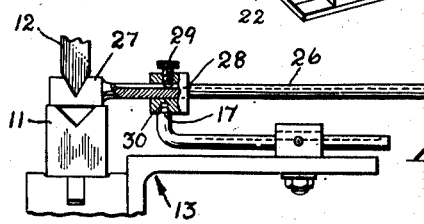
INVENTOR
R. W. SKINNER
A. G. FRAMPTON
PER
ATTORNEY

UNITED STATES PATENT OFFICE 2,638,141

SHEET METAL BENDING BRAKE

Roland Walter Skinner, Long Branch, Ontario, and Arthur George Frampton, Toronto, Ontario, Canada, assignors to A. V. Roe Canada Limited, Malton, Ontario, Canada, a corporation Application January 9, 1951, Serial No. 205,086

3 Claims. (Cl. 153—21)

This invention relates to improvements in apparatus for bending and shaping sheet metal.

Bending of sheet metal parts is customarily carried out on a power brake, the workpiece usually being positioned in the machine manually by abutting one of its edges or by engaging a tooling hole in the workpiece against adjustable stops, and holding it there until the shaping die is lowered and bears on it. The process is a simple and economical one, but heretofore the adjustable stops have been set more or less by trial and error. It is an object of this invention to provide in a brake for bending sheet metal means whereby the adjustable stops may be easily and accurately positioned so that the workpiece located thereby may be bent at the specified location when the brake is operated. It is another object of the invention to provide a convenient, simple and practical method of setting-up at the desired position the adjustable stops. It is a further object of the invention to provide a template for use in setting-up the adjustable stops.

The invention will more readily be understood by reference to the following description and the accompanying drawings, in which like reference characters designate corresponding parts throughout the several views and in which:

Fig. 1 is a perspective view of a power brake constructed in accordance with the invention;

Fig. 2 is a perspective view of a typical template constructed in accordance with the invention;

Fig. 3 is a broken-away elevational view of a transfer gauge in position on components of a power brake, for transposing the stop settings.

Referring to Figs. 1 and 2 of the drawings, a brake comprises a body or support 10 on which is mounted a stationary female die 11 and a conventionally driven reciprocating male die 12.

Adjustably mounted on the frame 10 are two stops 13 which provide means for positioning the workpieces. Each stop comprises a support 14 which may be adjusted up and down or to either side with respect to the frame after first loosening the nut 15, and a rod 16 having a vertically disposed shouldered locating pin 17 at one end; the rod is slidably mounted on the support 14 so that the distance between the dies and the pin 17 may be altered, the set screw 18 when tightened clamping the rod in the desired position.

The template assembly illustrated in Fig. 2 comprises a full scale template 20 of the part to be made and having mold lines 21 (lines along which bending is to take place) clearly indicated on its surface. In the preferred example shown, the template is a metal sheet on which the mold lines have been reproduced accurately from a full scale lofted original by a suitable photographic process. Guide means comprising brackets 22 are secured to the template, V-notches 23 being provided in the brackets and the apices of the V-notches being located directly above the mold lines or intended bend lines on the template. In the template are provided tooling holes 24, at locations well clear of the mold lines 21, for example, on the longitudinal centre line 25 of the template. The diameters of the tooling holes are preferably such that they are sliding fits on the pins 17. Instead of the brackets 22 being individual parts secured to the template, they may be formed from the template itself by punching and bending operations. Alternatively, the template may be made of heavy gauge sheet metal and grooves machined along the mold lines to provide guide means.

To set up the stops they are first spaced from each other by a distance equal to the spacing between the tooling holes 24 in the template and the stops 13 are also adjusted vertically to a position such that the shoulders of the pins are level with the top of the stationary die 11. The template is then positioned on the brake, with the V-notches corresponding to the mold line at which it is intended to make the first bending operation, substantially in registration with the dies, and the male die 12 is lowered slowly into the said notches until the template is held firmly in position. The rods 16 of the stops are then adjusted longitudinally until the pins 17 register with the respective tooling holes 24, and the rods are then firmly locked in position by tightening the set screws 18.

After this setting-up operation has been completed, the template is removed from the brake and the brake is then ready for use to bend workpieces in which tooling holes have previously been drilled at locations corresponding to the locations of the tooling holes 24 in the template. To set-up the stops for bending the workpieces at other positions as indicated by the template, the aforementioned operation is repeated but of course the template is positioned so that the male die 12 will engage other V-notches on the template.

It should be pointed out that with one template of the kind described, the brake may be set up for the production of right and left-hand parts of the same component. For this purpose, after having set-up the brake by means of the template for the production of say right-hand parts, a pair of transfer gauges as illustrated in Fig. 3 is provided to transpose the settings of the stops.

A transfer gauge comprises a rod 26 having at one end a V-block 27 and on which is slidably mounted a block 28 which may be clamped to the rod by a set screw 29. In the slidable block 28 is a hole 30 of a diameter corresponding to the diameter of the pins 17.

To transpose the settings of the stops 13, the two transfer gauges are positioned in the brake opposite the respective stops, and after loosening the set screws 29 the holes 30 in the respective blocks 28 are brought into registration with the pins 17; the male die 12 is then lowered slowly to firmly grip the blocks 28 at the V-notches, and the set screws 29 are then tightened thereby clamping the blocks 28 to the rods 26. The two transfer gauges are then transposed, the male die is again brought into engagement with the notches in the brackets, and after set screws 18 have been loosened the distances of the respective stops from the dies are re-adjusted by engaging the pins 17 in the holes 30 of the blocks 28, and the stops 13 are then locked into position by tightening the set screws 18. After the transfer gauges are removed, the brake is ready to produce opposite hand parts. This time, however, the workpieces are fed to the machine with their reverse faces upwards, although the bending operation is carried out as before.

It will be understood that the form of the invention herewith shown and described is to be taken as a preferred example of the same, and that various changes in the shape and arrangement of parts may be resorted to without departing from the spirit of the invention or altering the scope of the subjoined claims.

What we claim as our invention is:

1. A brake for bending sheet metal workpieces, comprising registering dies, at least one of which is reciprocatable, a removable template having guide means registrable with one of the dies and having two spaced tooling holes, and two spaced workpiece locating pins on the brake engageable with the template at the tooling holes for location of said locating pins by the template.

2. A template for locating the workpiece positioning means of a bending brake of the kind having two spaced workpiece locating pins and having registering dies, at least one of which is reciprocatable, comprising a plate having guide means located thereon at a position corresponding to the intended bend line of the workpiece and adapted to register with one of the dies to position the template relative to the dies, the plate having two spaced tooling holes for location of the locating pins by the template.

3. A template for locating the workpiece positioning means of a bending brake of the kind having two spaced workpiece locating pins and having registering dies, at least one of which is reciprocatable, comprising a plate, two spaced brackets on the plate and having notches, the brackets being located on the plate at positions such that a hypothetical line joining the notches is at a position corresponding to the intended bend line of the workpiece, the said brackets being adapted to register with one of the dies to position the template relative to the dies, the plate having two spaced tooling holes for location of the locating pins by the template.

ROLAND WALTER SKINNER.
ARTHUR GEORGE FRAMPTON.

References Cited in the file of this patent

UNITED STATES PATENTS

| Number | Name | Date |
|---|---|---|
| 2,466,685 | Cole | Apr. 12, 1949 |
| 2,510,768 | Williamson | June 6, 1950 |